(12) United States Patent  (10) Patent No.: US 7,566,213 B2
Nguyen et al.  (45) Date of Patent: Jul. 28, 2009

(54) FLEXIBLE ENROBED MOLDING DEVICE FOR MANUFACTURING A SUNKEN GROOVE IN A TIRE TREAD

(75) Inventors: Gia-Van Nguyen, Blagny (FR); Alain Emile Francois Roesgen, Asselborn (LU); Peter Phelps Roch, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 77 days.

(21) Appl. No.: 11/891,865

(22) Filed: Aug. 14, 2007

(65) Prior Publication Data

US 2008/0152743 A1  Jun. 26, 2008

Related U.S. Application Data

(60) Provisional application No. 60/876,327, filed on Dec. 21, 2006.

(51) Int. Cl.
B29C 35/02 (2006.01)

(52) U.S. Cl. .......................... 425/28.1; 425/37; 425/46; 425/470

(58) Field of Classification Search ................ 425/28.1, 425/35, 37, 46, 438, 470, 472, DIG. 58
See application file for complete search history.

(56) References Cited

U.S. PATENT DOCUMENTS

| | | | |
|---|---|---|---|
| 3,003,534 A | 10/1961 | Cousins | 152/211 |
| 4,154,564 A | 5/1979 | French | 424/28 D |
| 5,075,067 A * | 12/1991 | Rockarts et al. | 425/28.1 |
| 5,095,963 A * | 3/1992 | Maitre | 152/209.18 |
| 5,843,326 A * | 12/1998 | Bellot | 249/104 |
| 6,143,223 A | 11/2000 | Merino Lopez | 264/219 |
| 6,193,492 B1 | 2/2001 | Lagnier et al. | 425/28.1 |
| 6,408,910 B1 | 6/2002 | Lagnier et al. | 152/209.17 |
| 6,767,495 B2 | 7/2004 | Aperce et al. | 264/326 |
| 7,338,269 B2 * | 3/2008 | Delbet et al. | 425/37 |
| 7,507,078 B2 * | 3/2009 | Nguyen et al. | 425/28.1 |
| 2002/0134202 A1* | 9/2002 | Domange et al. | 76/101.1 |
| 2003/0201048 A1 | 10/2003 | Radulescu et al. | 152/209.25 |
| 2006/0137793 A1 | 6/2006 | Nguyen et al. | 152/209.18 |
| 2006/0137794 A1 | 6/2006 | Nguyen et al. | 152/209.22 |
| 2006/0144491 A1 | 7/2006 | Nguyen et al. | 152/209.18 |
| 2006/0144492 A1 | 7/2006 | Nguyen et al. | 152/209.23 |

FOREIGN PATENT DOCUMENTS

| | | |
|---|---|---|
| DE | 183380 | 6/1906 |
| DE | 1274799 | 11/1964 |
| EP | 0 450 251 B1 | 9/1996 |
| EP | 1588820 A1 | 10/2005 |
| EP | 1676695 A2 | 7/2006 |
| FR | 1476254 | 4/1966 |

OTHER PUBLICATIONS

European Search Report completed Mar. 7, 2008.

* cited by examiner

*Primary Examiner*—James Mackey
(74) *Attorney, Agent, or Firm*—June E. Rickey

(57) ABSTRACT

A mold and molding device for forming a sunken groove in a tire is provided. The molding device includes a thin flexible wire having one or more molded elastomer elements thereon. The flexible wire is preferably hyperelastic and the molded elastomer is preferably silicone rubber.

10 Claims, 2 Drawing Sheets

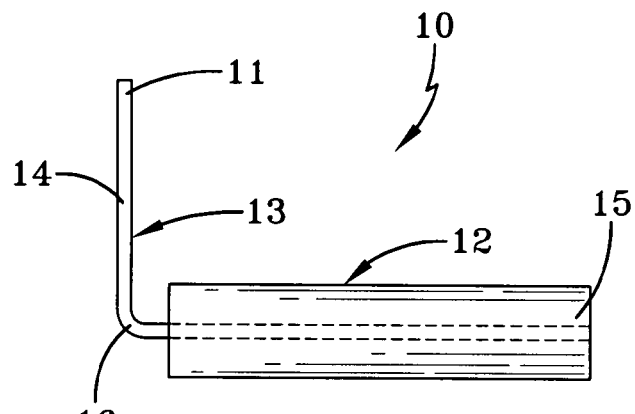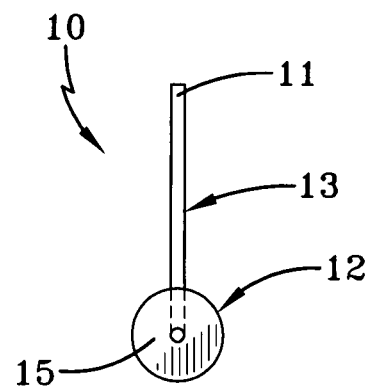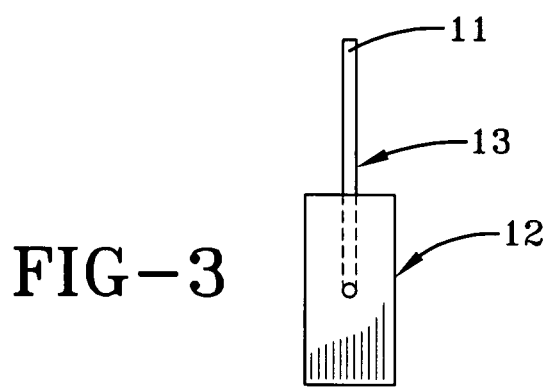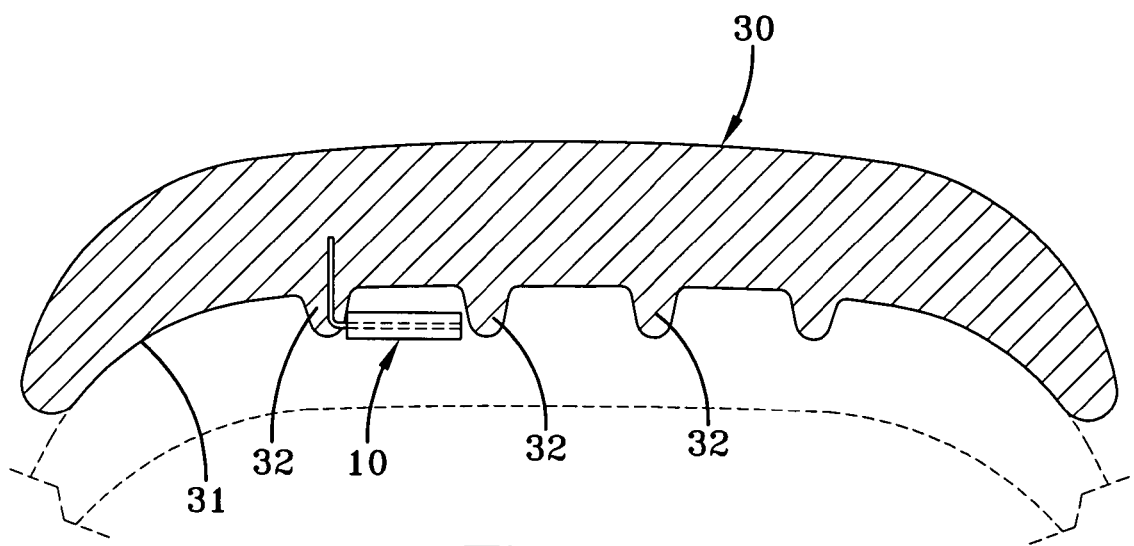

FLEXIBLE ENROBED MOLDING DEVICE FOR MANUFACTURING A SUNKEN GROOVE IN A TIRE TREAD

This application claims the benefit of, and incorporates by reference, U.S. Provisional Application No. 60/876,327 filed Dec. 21, 2006.

FIELD OF THE INVENTION

The present invention relates to the molding of tires, and in particular, the molding of treads for a tire.

BACKGROUND OF THE INVENTION

As a tire wears, the surface of the tread decreases due to frictional contact with the road surface. As the tire wears, the volume of the tire grooves decrease and the net to gross ratio increases. Eventually the tire will require replacement.

The tread elements in relief on a tire tread, such as the sipes, tread blocks and grooves, play a fundamental role in tire traction or adhesion to the road both in the transverse direction and in the circumferential direction. Traction is especially critical when travelling on wet or snowy roads. For wet conditions, the grooves act as evacuation channels for allowing water to pass through the tread.

It is known in the prior art to attempt to solve the degrading tread condition through the use of sunken grooves. The sunken grooves, due to a limitation in manufacturing, are generally oriented perpendicular to the shoulder region. Molding elements are typically used to form the sunken grooves, and they are often difficult to remove from the tire once the tire has been cured. To make a sunken groove, the mold elements need to be rigid enough to penetrate the uncured or green rubber tread, but flexible enough to be extracted from the cured tire without damaging the tire. Another requirement is that the sunken groove needs to be large and thick enough to be efficient, which leads to a molding element so stiff that its extraction would damage the tire tread or the element itself would fail by a fatigue fracture. Thus it is desired to have a method and apparatus of forming sunk grooves that does not have the disadvantages described above.

SUMMARY OF THE INVENTION

A molding element for forming a sunken groove in a tire is provided. The molding device comprises a thin flexible wire having an elastomer molded to a first end of said flexible wire wherein the elastomer has a desired cross-sectional shape.

BRIEF DESCRIPTION OF THE DRAWINGS

The invention will be described by way of example and with reference to the accompanying drawings in which:

FIG. 1 is a schematic of a side view of a molding element for molding sunken grooves;

FIG. 2 is an end view of the molding device of FIG. 1;

FIG. 3 is an alternative cross-sectional shape of the molding device of FIG. 1; and FIG. 4 is a cross-sectional view of the molding device installed in a tire mold;

DETAILED DESCRIPTION OF THE INVENTION

Figure 5A:
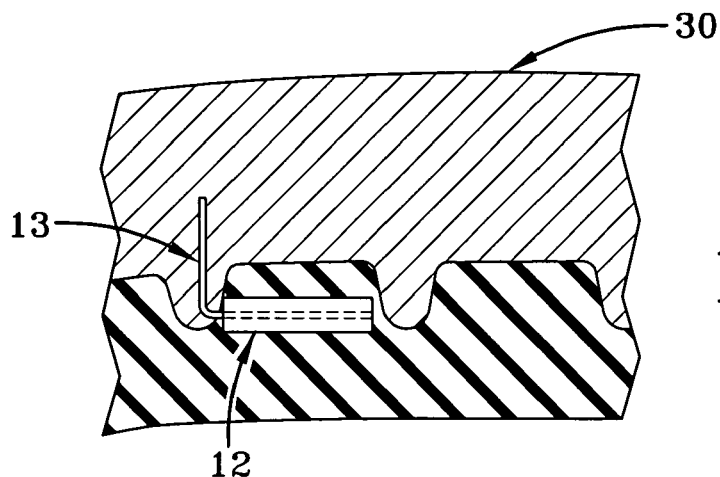
FIG. 5A is a cross-sectional view of the molding device installed in a tire mold.

FIG. 1 illustrates a first embodiment of a molding device 10, suitable for molding sunken grooves or sipes in a tire tread. A sunken groove or sipe is a void area disposed underneath the new tread surface of a tire that is not exposed when the tire is new, and that as the tire tread is worn during service, the sunken groove or sipe is exposed. The molding device 10 includes a distal end 11, an optional midsection 13 and one or more molding elements 12. The distal end 11 may be mounted in a tire mold in any desired orientation for forming sunken grooves or sipes. The molding element 12 may be any desired size, but for example, may be about 3-15 mm long, about 1-4 mm tall and about 5-8 mm deep. The molding element 12 may have a rectangular cross-sectional shape as shown in FIG. 3, circular as shown in FIG. 2 or any other desired cross-sectional shape. In addition, the longitudinal axis of the molding device 10 need not be linear, and may be nonlinear for example, curvilinear in shape or any other desired shape.

The molding device 10 may be comprised of a thin flexible wire 13 having a distal end 11, a mid section 14 and a second end 15 having a molding element 12 connected thereto. The distal end 11 may be mounted to a portion of a mold, as described in more detail, below. The mid section 14 of the flexible wire may comprise an optional radiused bend 16. Preferably, the second end 15 extends along the longitudinal axis of the element 12 and is substantially embedded within the interior of the flexible elastomer. More preferably, the second end 15 is centered within the element 12.

The one or more elements 12 are made of a flexible elastomer. The elastomer should be heat resistant up to 200 C, be elastic with good resistance to compression set, have good release properties and not adhere to the tread compound. Preferably, the flexible elastomer has a minimum elongation at break above 200% and tear strength greater than 10 kN/m. A preferred flexible elastomer is rubber or polytetrafluroethylene (PTFE). The PTFE may be reinforced, an example of a suitable material being Rulon®. If rubber is used, the rubber may be alternatively coated with a lubricant such as polytetrafluoroethylene (PTFE) or silicone. The elastomer is molded to the desired cross-sectional shape with the flexible wire therein. The elastomer may be injection molded directly onto the flexible wire.

Preferably, the element 12 is made of silicone rubber. The silicone rubber has the following formulation:

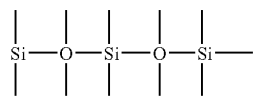

wherein most of the groups attached to the chain would be methyl (CH3) or vinyl (CH=CH2) to aid in vulcanization. One example of a silicone rubber which would work for the invention is commercially available by Dow Corning Corporation and sold under the trademark Silastic® under the LC 2004 series or the UX series.

The flexible wire 13 may be made of a flexible metal or material. It is preferred that the material be highly elastic, hyperelastic or superelastic, examples of which include, but are not limited to, shape memory alloys, Nickel-Titanium alloys, CuZnAl, CuAlNi and CuAlBe. It is preferred that the wire material have an elastic limit greater than or equal to about 5% elongation, and more preferably greater than or equal to 10%. The wire may have any desired cross-sectional shape.

FIG. 4 illustrates one example of the molding device shown in use with an upper portion of a tire mold 30. The molding device 10 is embedded in the green tire tread prior to cure. The molding device 10 may be mounted to in any desired orientation to the tire mold, so that for example, the sunken groove may be oriented circumferentially, axially or any other desired configuration. The molding device may be mounted in the segments of the mold corresponding to the crown portion of the tread or located in the portions of the mold corresponding to the sidewalls. The tire mold 30 has an inner surface 31 having relief elements 32 for forming a respective groove 34 in a tire tread.

Figure 5B:
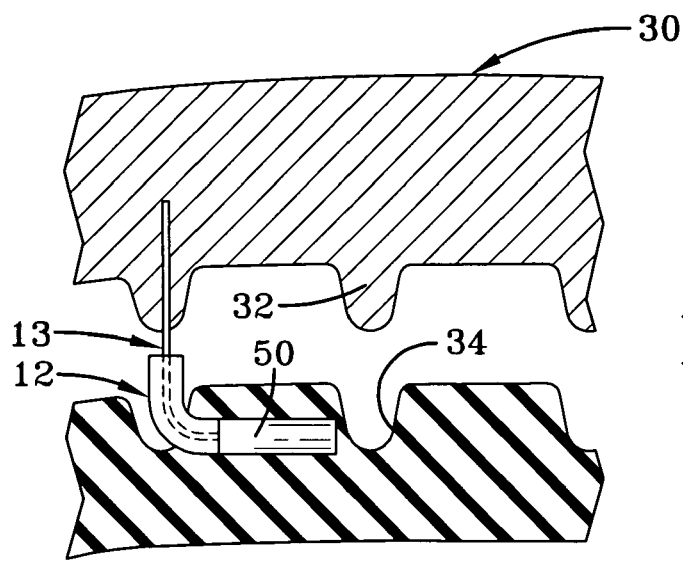
FIG. 5B is a cross-sectional view of the molding device shown during removal from the tire mold.
Figure 6:
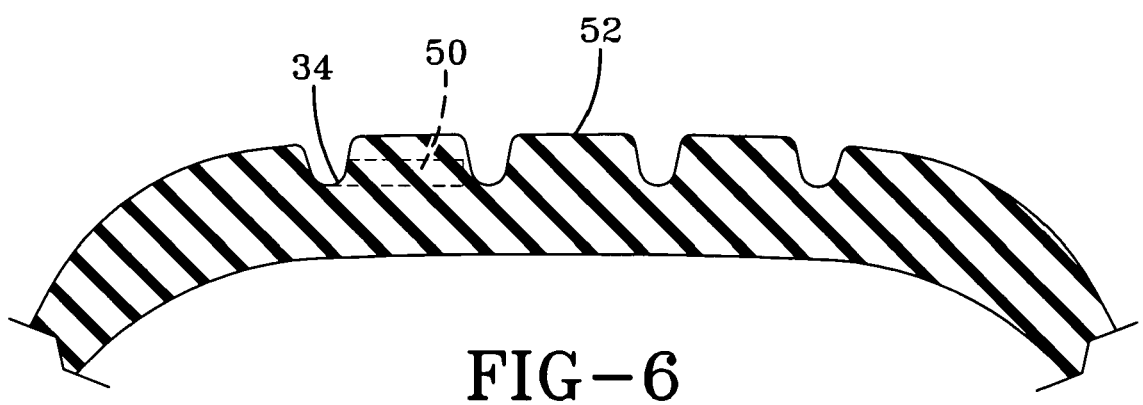
FIG. 6 is a partial cross-sectional view of a portion of a tire tread showing the void or sunk groove.

FIG. 5 illustrates the molding device 10 during extraction from the cured tire tread 40. The molding device is extracted from a groove 34 of the tire tread. As the molding device is pulled from the tread, the wire 13 elastically deforms and is straightened to almost 180 degrees. The molding element 12 elongates or deforms as it is pulled from the tread. FIG. 6 illustrates the sunken groove 50 formed below the tread surface 52 of the cured tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A molding device for forming a sunken groove in a tire, the molding device comprising a thin flexible wire and having an elastomer molded to a first end of said flexible wire wherein the elastomer has a desired cross-sectional shape, wherein the flexible wire is centered within the elastomer.

2. The molding device of claim 1 wherein the wire is formed from a superelastic alloy.

3. The molding device of claim 1 wherein the wire is formed from a material having an elastic limit greater than or equal to 5% elongation.

4. The molding device of claim 1 wherein the wire is formed from a material having an elastic limit greater than or equal to 10% elongation.

5. The molding device of claim 1 wherein the elastomer is comprised of a silicone polymer.

6. The molding device of claim 1 wherein the elastomer is comprised of a silicone rubber.

7. A mold for molding a tread band of a tire, the tread band being made of an elastomer compound, the mold comprising a mold surface for molding the tread and a molding device projecting from the mold surface so as to become embedded in the elastomer compound to be molded, wherein the molding device comprises a flexible wire having a shaped elastomer surrounding a portion of said flexible wire, wherein the flexible wire is centered within the shaped elastomer.

8. The mold of claim 7 wherein the flexible wire is formed from a material having an elastic limit greater than or equal to 5% elongation.

9. The mold of claim 7 wherein the wire is formed from a material having an elastic limit greater than or equal to 10% elongation.

10. The mold of claim 7 wherein the shaped elastomer is comprised of a silicone rubber.

* * * * *